(12) United States Patent
Tai

(10) Patent No.: US 9,505,924 B2
(45) Date of Patent: Nov. 29, 2016

(54) ABS RESIN COMPOSITION

(71) Applicant: DAICEL POLYMER LTD., Tokyo (JP)

(72) Inventor: Toshihiro Tai, Himeji (JP)

(73) Assignee: DAICEL POLYMER LTD., Minato-ku, Tokyo (JP)

( * ) Notice: Subject to any disclaimer, the term of this patent is extended or adjusted under 35 U.S.C. 154(b) by 0 days.

(21) Appl. No.: 14/644,883

(22) Filed: Mar. 11, 2015

(65) Prior Publication Data

US 2015/0284559 A1 Oct. 8, 2015

(30) Foreign Application Priority Data

Apr. 3, 2014 (JP) .................. 2014-076660

(51) Int. Cl.
*C08L 33/10* (2006.01)
*C08L 33/12* (2006.01)
*C08L 55/02* (2006.01)
*C08G 69/40* (2006.01)
*C08G 69/44* (2006.01)

(52) U.S. Cl.
CPC ............... *C08L 55/02* (2013.01); *C08G 69/40* (2013.01); *C08G 69/44* (2013.01); *C08L 33/10* (2013.01); *C08L 33/12* (2013.01); *C08L 2201/04* (2013.01); *C08L 2201/10* (2013.01); *C08L 2205/03* (2013.01); *C08L 2205/035* (2013.01)

(58) Field of Classification Search
None
See application file for complete search history.

(56) References Cited

U.S. PATENT DOCUMENTS

2010/0222511 A1* 9/2010 Sumimoto ........... B65D 25/107
525/167

FOREIGN PATENT DOCUMENTS

| JP | 08-253640 A | 10/1996 |
| JP | 2005-139215 A | 6/2005 |
| JP | 2006-052378 A | 2/2006 |
| JP | 2007-277446 A | 10/2007 |

* cited by examiner

*Primary Examiner* — Jeffrey Mullis
(74) *Attorney, Agent, or Firm* — Flynn, Thiel, Boutell & Tanis, P.C.

(57) ABSTRACT

An ABS resin composition including: (A) 100 parts by mass of an ABS resin having a total light transmittance of 70% or more; (B) 1 to 70 parts by mass of an antistatic agent including a polyether ester amide having a polyamide 12 skeleton; (C) 1 to 70 parts by mass of an acid-modified methacrylic acid-based polymer having a refractive index of 1.50 to 1.56.

4 Claims, No Drawings

ABS RESIN COMPOSITION

TECHNICAL FIELD

The present invention relates to an ABS resin composition which provides a molded article having an excellent antistatic property and being suitable for a container for storing and transporting of electric and electronic devices, and electric and electronic parts.

BACKGROUND ART

A styrene-based resin such as an ABS resin has been widely used as a manufacturing material for electric and electronic devices because of its excellent transparency and electric insulation, but there are problems in which bad influences due to dust adsorption and generation of static electricity are exerted since the resin is electrically-charged easily by friction or the like.

When blending an antistatic agent in order to solve the above-mentioned problems, there is a problem in which a gas (outgas) caused by the antistatic agent is generated from the intermediate products and the final products at the time of storage and transportation of the products in addition to the time of manufacturing.

In JP-A 8-253640, there is described a resin composition having an excellent antistatic property and obtained by blending a mixture or the like of a (meth)acrylic acid ester-based polymer and a polyether ester amide as an antistatic agent, into a styrene-based polymer. As the polyether ester amide, there is described one obtained by causing (1) a polyamide having carboxylic groups at both ends and (2) a poly(oxyalkylene) glycol to react in the presence of (3) an organic acid salt of zirconium (claim 3, Paragraph 0019), and in the Example, there is used "PELESTAC 7350B" manufactured by SANYO CHEMICAL INDUSTRIES.

In JP-A 2005-139215, there is described an antistatic thermoplastic resin composition including: a polyamide elastomer containing a hard segment formed of a polyamide and a soft segment formed of a poly(alkyleneoxide) glycol; and a styrene-based polymer.

In JP-A 2006-52378, there is described a thermoplastic resin composition obtained by including: a hard segment of a polyamide 12 and a soft segment of a poly(alkyleneoxide) glycol, to a styrene-based resin.

In JP-A 2007-277446, there is described a transparency-sustaining antistatic thermoplastic resin composition obtained by blending an antistatic agent into a transparent thermoplastic resin.

Although an excellent antistatic property and inhibition of the generation of an outgas are described in JP-A 8-253640, JP-A 2005-139215, JP-A 2006-52378 and JP-A 2007-277446, there is room for improvement.

DISCLOSURE OF THE INVENTION

An object of the present invention is to provide an ABS resin composition which gives a molded article having an excellent antistatic property and transparency, and which generates a small amount of an outgas at the time of manufacturing and storage/transportation.

According to the present invention, there is provided an ABS resin composition including:
(A) 100 parts by mass of an ABS resin having a total light transmittance of 70% or more,
(B) 1 to 70 parts by mass of an antistatic agent including a polyether ester amide having a polyamide 12 skeleton, and
(C) 1 to 70 parts by mass of an acid-modified methacrylic acid-based polymer having a refractive index of 1.50 to 1.56.

The molded article obtained from the composition of the present invention is excellent in antistatic property and transparency, and also generates a small amount of an outgas.

DETAILED DESCRIPTION OF THE INVENTION

<Component (A)>

The component (A) is an ABS resin having a total light transmittance of 70% or more. The total light transmittance of the component (A) is preferably 80% or more, more preferably 85% or more. The total light transmittance is measured by the method described in the Examples.

<Component (B)>

The antistatic agent of component (B) is formed of a polyether ester amide having a polyamide 12 skeleton, and is a component that can give an antistatic property and also acts to reduce the generation of an outgas.

The polyether ester amide having a polyamide 12 skeleton of the component (B) can be manufactured by using a polyamide 12 and a poly(oxyalkylene) glycol in accordance with the manufacturing method described in JP-A 6-287547, the manufacturing method described in the Examples of JP-A 2006-206894, the manufacturing method described in the Examples of JP-A 2008-31461, the manufacturing method in the Examples of JP-A 2008-106251, and the like.

The polyether ester amide having a polyamide 12 skeleton of the antistatic agent serving as the component (B) preferably has a surface specific resistance value within the range of $1 \times 10^7 \Omega$ to $1 \times 10^9 \Omega$.

As the antistatic agent of component (B), there can be used a commercially available product such as PELESTAT 1251 (Trade Name) (pale yellow pellet, melting point: about 148° C., MFR 215° C., 21.18 N: about 20 g/10 min, refractive index: 1.51, surface specific resistance: $1 \times 10^9 \Omega$; these being catalogue values), and PELECTRON AT (Trade Name) (pale yellow pellet, melting point: about 145° C., MFR 215° C., 21.18 N: about 30 g/10 min, refractive index: 1.51, surface specific resistance: $1 \times 10^7 \Omega$; these being catalogue values).

The refractive indexes of component (A) and component (B) are preferably the same as or approximate to each other, and the refractive index of component (A) is preferably 1.49 to 1.55, and the refractive index of component (B) is preferably 1.50 to 1.53.

<Component (C)>

The component (C) is an acid-modified methacrylic acid-based copolymer having a refractive index of 1.50 to 1.56, and a component that acts to enhance the dispersibility of component (A) and component (B).

The acid-modified methacrylic acid-based polymer is preferably a copolymer of methyl methacrylate and styrene, which is modified by maleic anhydride at its end.

A ratio of component (B) to component (C), that is, (B)/(C) is preferably 1/2 to 10/1, more preferably 1/2 to 4/1, and further preferably 1/2 to 2/1.

<Component (D)>

The composition of the present invention can include a methacrylic acid-based polymer (however, excluding the acid-modified methacrylic acid-based polymer) as the component (D) in order to increase heat resistance (heat deformation temperature), and to regulate the refractive index.

The methacrylic acid-based polymer of component (D) is preferably selected from polymethyl methacrylate, and a methyl methacrylate copolymer containing methyl methacrylate as a main component.

Examples of a comonomer component of the methyl methacrylate copolymer include: an acrylic acid ester such as methyl acrylate, ethyl acrylate, propyl acrylate, isopropyl acrylate, butyl acrylate, amyl acrylate, hexyl acrylate, octylacrylate, 2-ethylhexylacrylate, cyclohexyl acrylate, dodecyl acrylate, octadecyl acrylate, phenyl acrylate or benzyl acrylate; a methacrylic acid ester such as ethyl methacrylate, propyl methacrylate, isopropyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate or benzyl methacrylate; a maleimide compound such as N-phenylmaleimide or N-cyclohexylmaleimide; styrene, acrylonitrile, and the like.

The amount of component (B) in the composition of the present invention is preferably 5 to 60 parts by mass relative to 100 parts by mass of component (A), more preferably 10 to 40 parts by mass, and further preferably 15 to 40 parts by mass.

The amount of component (C) in the composition of the present invention is preferably 5 to 50 parts by mass relative to 100 parts by mass of component (A), more preferably 5 to 40 parts by mass.

When the amount of component (B) is 25 parts by mass or less, the amount of component (C) is preferably 5 to 15 parts by mass relative to 100 parts by mass of component (A), more preferably 8 to 15 parts by mass.

When the amount of component (B) is more than 25 parts by mass, the amount of component (C) is preferably 20 to 40 parts by mass relative to 100 parts by mass of component (A), more preferably 20 to 35 parts by mass.

The amount of component (D) in the composition of the present invention is preferably 1 to 90 parts by mass relative to 100 parts by mass of component (A), more preferably 5 to 90 parts by mass.

The composition of the present invention can contain a known additive for resins within the range of being capable of solving the problem. Examples of the known additives for resins can include a stabilizer (antioxidant, UV absorber, light stabilizer, thermal stabilizer, or the like), a flame retardant (phosphorous-based flame retardant, halogen-based flame retardant, inorganic-based flame retardant, or the like), a flame retardant auxiliary, a crosslinking agent, a reinforcing material, a nucleating agent, a coupling agent, a lubricant, a wax, a plasticizer, a mold-releasing agent, an impact improver, a color improver, a flowability improver, a colorant (dye, etc.), a dispersant, an antifoaming agent, an antibacterial, a preservative, a viscosity modifier, a thickener, and the like.

The composition of the present invention can be made into a desired molded article having a shape corresponding to the intended use.

The molded article of the present invention preferably has a total light transmittance of 70% or more, more preferably 75% or more, and preferably has a haze of 30% or less, more preferably 25% or less.

The molded article of the present invention preferably has a surface specific resistance of $1 \times 10^{11}$ or less, more preferably $1 \times 10^{10}$ or less.

Since the molded article obtained from the composition of the present invention is excellent in antistatic properties and transparency, the article is suitable for a container for storing and transporting of electric and electronic devices, and electric and electronic parts, and specific examples thereof can include: a plate (or cover) and an inner member of an amusement machine (for example, a pachinko game machine, a pinball machine, and the like); a molded product for packaging a large electronic part (for example, a tray for storing a liquid crystal plate, and the like); a molded product for transportation having housing recesses for housing a small electronic part (connector, and the like), for example, a tray for transporting an electronic part (an injection tray, a vacuum-molded tray, and the like) etc.; and the like.

EXAMPLES

Examples and Comparative Examples

After blending each component in the blending amounts (part by mass) shown in Table 1, the pellets of the compositions of the Examples and Comparative Examples were obtained by using an extruder.

The following respective measurements were carried out using the obtained composition. The results are shown in Table 1.

Component (A)

ABS resin: TECHNO ABS 810 (total light transmittance 89%; refractive index 1.52) (manufactured by Techno Polymer Co., Ltd.)

Component (B)

Antistatic agent 1: PELESTAT 1251 (PA12 skeleton, refractive index 1.51, surface specific resistance $1 \times 10^9$) (Sanyo Chemical Industries Ltd.)

Antistatic agent 2: PELESTRON AT (PA12 skeleton, refractive index 1.51, surface specific resistance $1 \times 10^7$) (Sanyo Chemical Industries Ltd.)

Comparative antistatic agent: PELESTAT 6321 (PA6 skeleton, surface specific resistance $1 \times 10^9$) (Sanyo Chemical Industries Ltd.)

Component (C)

Acid-modified copolymer 1: Styrene-methyl methacrylate-maleic anhydride copolymer (Tg=120° C., refractive index 1.51) 980N (manufactured by ASAHI KASEI CHEMICALS CORPORATION)

Acid-modified copolymer 2: Styrene-methyl methacrylate-maleic anhydride copolymer (Tg=140° C., refractive index 1.55) R-200 (manufactured by DENKI KAGAKU KOGYO KABUSHIKI KAISHA)

Comparative acid-modified copolymer: Styrene-N-phenylmaleimide-maleic anhydride copolymer MS-NB (Tg=196° C., refractive index 1.59) (manufactured by DENKI KAGAKU KOGYO KABUSHIKI KAISHA)

Component (D)

Methacrylic acid-based copolymer 1: N-phenylmaleimide-N-cyclohexylmaleimide-methyl methacrylate-styrene copolymer (Tg=130° C., refractive index 1.52) PML 203 (manufactured by NIPPON SHOKUBAI CO., Ltd.)

Methacrylic acid-based copolymer 2: methyl methacrylate-methyl acrylate copolymer (Tg=98° C., refractive index 1.49) SUMIPEC EX (manufactured by SUMITOMO CHEMICAL CO., Ltd.)

(Others)

Stabilizer 1: Hindered phenol-based antioxidant (Irganox 1010, manufactured by BASF)

(1) Surface specific resistance (0)

Measured on the basis of ASTM D257.

(2) Heat deformation temperature (HDT; 1.8 MPa) (° C.)

Measured on the basis of ISO 75.

(3) Charpy impact strength (kJ/m$^2$)

Measured a Charpy impact strength with notch in accordance with ISO 179/leA.

(4) Total light transmittance and haze (%)

Through the use of the above-mentioned pellets, a plate of 90 mm length×50 mm width×1 mm thickness and plates of 2 mm thickness and 3 mm thickness were produced by injection molding.

A total light transmittance and haze of these plates were measured by using a direct reading haze computer (Type HGM-2D, manufactured by Suga Test Instruments Co., Ltd.).

Note that the "opaque" means the total light transmittance was 20% or less.

(5) Effect of inhibition of outgas

Through the use of the above-mentioned pellets, a plate of 90 mm length×50 mm width×1 mm thickness was produced by injection molding.

When the plate was introduced into a chamber of a generated gas-condensing and -introducing device and was kept at 100° C. for 30 minutes the generated outgas was collected by the following method and the amount of the outgas was analyzed.

<Outgas-Condensing and -Introducing Device>
(Device)
MSTD-258M (manufactured by GL Sciences Inc.)
(Device Specification)
  Material of chamber: Quartz
  Size of chamber: Inside diameter 100 mm, height 50 mm
  Controller for collection: Pump system (diaphragm)
(Collection Conditions)
  Chamber purge gas flow rate: N$_2$ gas 340 ml/min
  Purge gas period of time: 0.1 min
  Inside temperature of chamber: 100° C.
  Collecting flow rate: 150 ml/min
  Collecting period of time: 30 min
<Analysis Method>
(Analyzer)
With P&T GC part Agilent 6890N
  MS part Agilent 5973
  P&T part GERSTEL TDS A2
(Analysis Conditions)
GC analysis conditions
  Column: Agilent DB-5MS (length 30 m, inside diameter 0.25 mm)
  Column temperature: 40° C., holding for 3 min
  40 to 220° C., 20 min (temperature elevation speed: 9° C./min)
  220 to 280° C., 6 min (temperature elevation speed: 10° C./min)
  280° C., holding 5 min
  Inlet temperature: 280° C.
  Carrier gas: He 1.5 ml/min
  Sprit ratio: 10:1
MS analysis conditions
  Ionization method: Electron ionization method
  MS quadrupole temperature: 150° C.
  MS ion source temperature: 260° C.
  EM voltage: 2000 V
P&T conditions
  Adsorption tube purge temperature: 280° C.
  Cold trap temperature: −100° C.
  Purge gas flow rate: He 50 ml/min
  Adsorption tube purge time: 15 min

TABLE 1

| | | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| (A) | ABS resin | 100 | 100 | 100 | 100 | 100 | 100 | 100 | 100 | 100 | 100 | 100 |
| (B) | Antistatic agent 1 | | 20 | | | | | | 18 | | | |
| | Antistatic agent 2 | 20 | | 60 | 30 | 38 | 20 | | | 18 | | 20 |
| | Comparative antistatic agent | | | | | | | 18 | | | 20 | |
| (C) | Acid-modified copolymer 1 | 13 | 13 | 30 | 20 | 25 | | | | | 13 | |
| | Acid-modified copolymer 2 | | | | | | 6 | | | | | |
| | Comparative acid-modified copolymer | | | | | | | | | | | 13 |
| (D) | Methacrylic acid-based copolymer 1 | | | 10 | 50 | 88 | | | | | | |
| | Methacrylic acid-based copolymer 2 | | | | | | 7 | | | | | |
| Others | Stabilizer 1 | 0.1 | 0.1 | 0.1 | 0.1 | 0.1 | 0.1 | 0.1 | 0.1 | 0.1 | 0.1 | 0.1 |
| | Surface specific resistance (Ω) | $1 \times 10^{10}$ | $1 \times 10^{11}$ | $1 \times 10^{9}$ | $1 \times 10^{10}$ | $1 \times 10^{10}$ | $1 \times 10^{11}$ | $8 \times 10^{11}$ | $5 \times 10^{11}$ | $8 \times 10^{9}$ | $1 \times 10^{12}$ | $1 \times 10^{10}$ |
| | HDT (° C.) | 72 | 72 | 65 | 77 | 85 | 72 | 68 | 68 | 68 | 72 | 73 |
| | Charpy impact strength (kJ/m$^2$) | 13 | 13 | 11 | 5 | 4 | 13 | 13 | 13 | 13 | 11 | 11 |
| | Total light transmittance (%) | 80 | 80 | 75 | 80 | 75 | 80 | 75 | 75 | 75 | 80 | Opaque |
| | Haze (%) | 20 | 20 | 25 | 20 | 20 | 20 | 25 | 30 | 30 | 10 | Opaque |
| | Outgas amount (ng/g) | 2000 | 1800 | 1800 | 1500 | 1200 | 1700 | 3500 | 2100 | 2300 | 3000 | 2100 |

The invention claimed is:

1. An ABS resin composition comprising:
   (A) 100 parts by mass of an ABS resin having a total light transmittance of at least 70%;
   (B) 1 to 70 parts by mass of an antistatic agent including a polyether ester amide having a polyamide 12 skeleton;
   (C) 1 to 70 parts by mass of an acid-modified methacrylic acid-based polymer having a refractive index of 1.50 to 1.56; and
   (D) a methacrylic acid-based polymer that is not acid-modified.

2. The ABS resin composition according to claim 1, wherein a surface specific resistance of the polyether ester amide having a polyamide 12 skeleton of the component (B) is $1 \times 10^7 \Omega$ to $1 \times 10^9 \Omega$.

3. A molded article obtained from the ABS resin composition according to claim 1, and having a total light transmittance of 70% or more and a surface specific resistance of $1 \times 10^{11}$ or less.

4. The ABS resin according to claim 1, wherein the acid-modified methacrylic acid-based polymer is a copolymer of methyl methacrylate and styrene, modified by maleic anhydride at an end thereof, and the methacrylic acid based polymer that is not acid modified is selected from polymethyl methacrylate and a methyl methacrylate copolymer containing methyl methacrylate as a main component.

* * * * *